United States Patent
Geiger

(10) Patent No.: US 12,400,217 B2
(45) Date of Patent: Aug. 26, 2025

(54) CREDIT CARD SYSTEM HAVING LIMITED CARD DATA INDICIA

(71) Applicant: Darryl Geiger, DeSoto, TX (US)

(72) Inventor: Darryl Geiger, DeSoto, TX (US)

(73) Assignee: CJG Tech LLC, Dallas, TX (US)

( * ) Notice: Subject to any disclaimer, the term of this patent is extended or adjusted under 35 U.S.C. 154(b) by 217 days.

(21) Appl. No.: 18/241,322

(22) Filed: Sep. 1, 2023

(65) Prior Publication Data

US 2024/0086895 A1 Mar. 14, 2024

Related U.S. Application Data

(60) Provisional application No. 63/405,794, filed on Sep. 12, 2022.

(51) Int. Cl.
G06Q 20/34 (2012.01)
G06Q 20/40 (2012.01)

(52) U.S. Cl.
CPC ........... *G06Q 20/355* (2013.01); *G06Q 20/40* (2013.01)

(58) Field of Classification Search
CPC .............................. G06Q 20/355; G06Q 20/40
See application file for complete search history.

(56) References Cited

U.S. PATENT DOCUMENTS

| | | |
|---|---|---|
| 7,748,616 B2 | 7/2010 | Wong et al. |
| 8,678,288 B2 | 3/2014 | Eng |
| 2001/0034717 A1 | 10/2001 | Whitworth |
| 2009/0159696 A1 | 6/2009 | Mullen |
| 2009/0309701 A1 | 12/2009 | Peled |
| 2014/0114779 A1 | 4/2014 | Singhal |
| 2021/0027276 A1 | 1/2021 | Wyatt |
| 2021/0110391 A1 | 4/2021 | Mullen et al. |

OTHER PUBLICATIONS

BBVA Launches Aqua, the first card without numbers or a CVV, accessed on Dec. 1, 2021; https: //www.bbva.com/en/es/bbva-launches-aqua-the-first-card-without-numbers-or-a-cvv/.

*Primary Examiner* — Scott S Trotter
(74) *Attorney, Agent, or Firm* — J. Miguel Hernandez; David W. Carstens; Carstens, Allen & Gourley, LLP

(57) ABSTRACT

A transaction card for secure payments. The transaction card including a personalized indicia displayed on a surface of the transaction card. The user of the transaction card may select the personalized indicia. The transaction card further includes an encoded portion configured to communicate with a transaction card reader. A complete transaction card number associated with the transaction card is stored on the encoded portion. A method of manufacturing a secure transaction card. The secure transaction card comprises an encoded portion. The method includes the step of receiving, from a user, a personalized indicia associated with the secure transaction card. The method further includes the step of displaying the personalized indicia on the secure transaction card. The method further includes storing a complete transaction card number on the encoded portion, wherein the encoded portion communicates with a transaction card reader.

20 Claims, 4 Drawing Sheets

CREDIT CARD SYSTEM HAVING LIMITED CARD DATA INDICIA

CROSS-REFERENCE TO RELATED APPLICATIONS

This application claims priority to U.S. Provisional Application No. 63/405,794, filed on Sep. 12, 2022, which is hereby incorporated herein by reference in its entirety.

BACKGROUND

Technical Field

The present disclosure relates to credit card security. More particularly, and not by way of limitation, the present disclosure is directed to an apparatus, system, and/or method for a credit card having limited card data.

Description of Related Art

Traditional credit cards provide various ways of communicating transaction data. A first type of credit card utilizes a magnetic strip for swiping through credit card readers, automated teller machines (ATMs), and other devices that support the present credit card and banking infrastructure. Another type of credit card utilizes a chip having a microprocessor to communicate with credit card readers. Another type of credit card utilizes radio frequencies to wirelessly communicate with credit card readers. However, each of the available credit card types remain susceptible to fraud and/or misappropriation because they display complete information associated with the credit card holder and/or account. It would be advantageous to have an apparatus, system, and/or method for a credit card having limited card data that overcomes the disadvantages of the art. The present disclosure provides such an apparatus, system, and method.

BRIEF SUMMARY

The present disclosure is directed to a transaction card for secure payments. The transaction card includes a personalized indicia displayed on a surface of the transaction card. The user of the transaction card may select the personalized indicia. The transaction card further includes an encoded portion configured to communicate with a transaction card reader. A complete transaction card number associated with the transaction card is stored on the encoded portion.

In another aspect, the present disclosure is directed to a method of manufacturing a secure transaction card. The secure transaction card comprises an encoded portion. The method includes the step of receiving, from a user, a personalized indicia associated with the secure transaction card. The method further includes the step of displaying the personalized indicia on the secure transaction card. The method further includes storing a complete transaction card number on the encoded portion, wherein the encoded portion communicates with a transaction card reader.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1A:
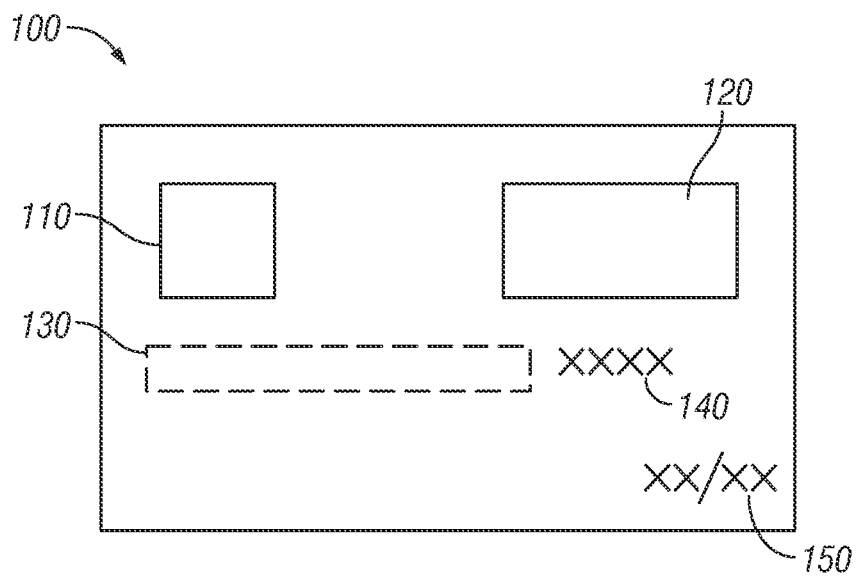
FIG. 1A is a front view of a transaction card.
Figure 1B:
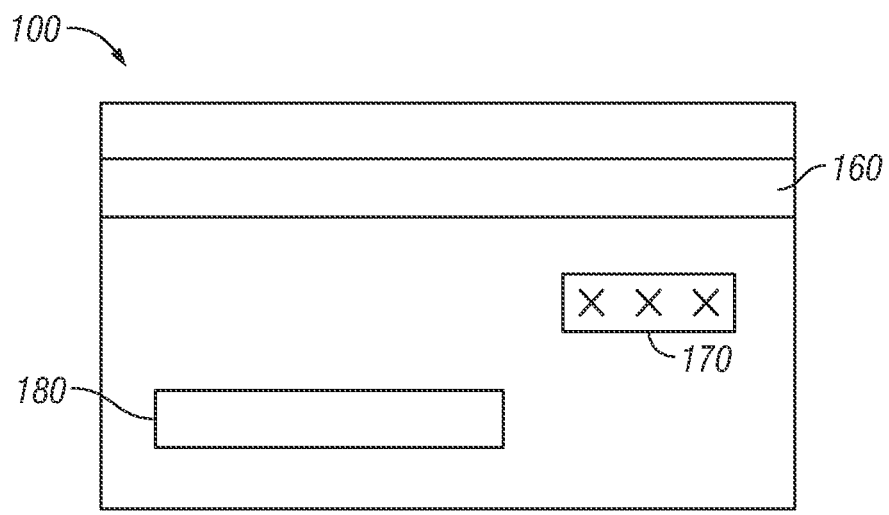
FIG. 1B is a rear view of the transaction card in FIG. 1A.

FIGS. 1A-1B illustrates front and rear views of a transaction card 100 for secure payments. The transaction card 100 may be a credit card, debit card, gift card, or any similar financial instrument known in the art. The transaction card 100 may include an encoded portion 110, 160 an issuer identification 120, a personalized indicia 140, and an expiration date 150. The encoded portion 110, 160 may be a magnetic strip, a contact chip, and/or a contactless chip. The encoded portion 110, 160 is configured to communicate with a transaction card reader for payment of goods and/or services. The issuer identification 120 is a marking identifying the name of the financial institution or company issuing the transaction card 100 to a user. The expiration date 150 indicates the date through which the transaction card 100 is valid.

The personalized indicia 140 is displayed on the transaction card 100 and comprises characters such as numbers, letters, symbols, or any combination thereof. The user of the transaction card 100 selects the personalized indicia 140. While the length of the characters in the personalized indicia 140 may vary from between one to ten characters. In at least one example, the personalized indicia 140 comprises four characters. The personalized indicia 140 may form a portion of the transaction card number, but only the personalized indicia 140 is displayed on the transaction card 100. The remaining portion 130 of the transaction card number is not displayed to enhance the security of the transaction card 100. The complete transaction card number is stored on the encoded portion 110 for communication with the transaction card reader. In at least one example, the transaction card number comprises sixteen digits, with four sets of four digits. The user may select any set of four digits for display as the personalized indicia 140. In another example, the user can choose any four digits within the sixteen-digit transaction card number for display as the personalized indicia 140. The encoded portion 110 may also include information relating to the user's name, the issuing bank, expiration date, credit card verification numbers, and type of credit card. The transaction card 100 may also include a card verification value 170 and a user signature block 180 for added security.

It is advantageous to display only the personalized indicia 140 on the transaction card 100 because it decreases the likelihood of fraudulent transactions. Traditional cards display the complete account number and other information on one of the faces of the card, which enables others to misappropriate the card by memorizing or copying the card information. For example, cards are generally presented to servers at restaurants and bars to open a "tab" for the food and drinks that the patron orders. If the server retains the card until the patron closes the tab, the card is susceptible to copying without the patron's knowledge. By displaying only the personalized indicia 140 on the transaction card, another person cannot capture the necessary card information for purchases that do not require presenting the card for payment.

Moreover, the personalized indicia 140 still enables merchants to verify a purchase before approval. For example, a server can compare the receipt corresponding to the user's closed tab and verify that the ending characters match with the characters of the personalized indicia 140. Other information from the encoded portion 110, 160 can be compared to the visible information appearing on the face of the card portion to verify the card and purchase. It is also advantageous for the user to select the personalized indicia 140 because the user is more likely to remember the personalized indicia 140 compared to random indicia or the full transaction card number. It is also advantageous in situations where the user has multiple transaction cards because the user is not required to memorize or remember multiple, random indicia.

Another security benefit of the transaction card 100 is the ability for a customer to obtain the remaining portion 130 of the transaction card number. For example, if the customer forgets the remaining portion 130 of the transaction card number, they may request the information by notifying the bank or card issuer. The bank or card issuer will send the information to the customer via a preferred secure notification method which the customer selects when signing up for the transaction card 100. The secure notification method may include text message, email, app notification, phone call, or other secure notification method.

The process for creating or manufacturing the transaction card 100 involves the user selecting a personalized indicia that will be associated with the transaction card 100. The personalized indicia 140 selected by the user may form a portion of the number associated with the transaction card 100. For example, the account number for a transaction card 100 may contain about sixteen characters, with the last three or four characters identifying the user's account number. In configurations where the personalized indicia 140 forms a portion of the transaction card number, the user is selecting the last three or four characters of the transaction card number. Alternatively, the personalized indicia 140 may form an added portion of the transaction card number where the user is selecting three or four characters to add to the transaction card number. Once selected, the personalized indicia 140 is displayed on the transaction card 100. In one example, the personalized indicia 140 is displayed at a bottom portion of the top surface of the transaction card 100. In another example, the personalized indicia 140 is displayed at a bottom portion of the bottom surface of the transaction card 100. The personalized indicia 140 may also be displayed at any other portion of any surface of the transaction card 100. The complete transaction card number is stored on the encoded portion 110, 160 of the transaction card 100. The personalized indicia 140 of the transaction card 100 may comprise characters such as numbers, letters, symbols, or any combination thereof.

Figure 2:
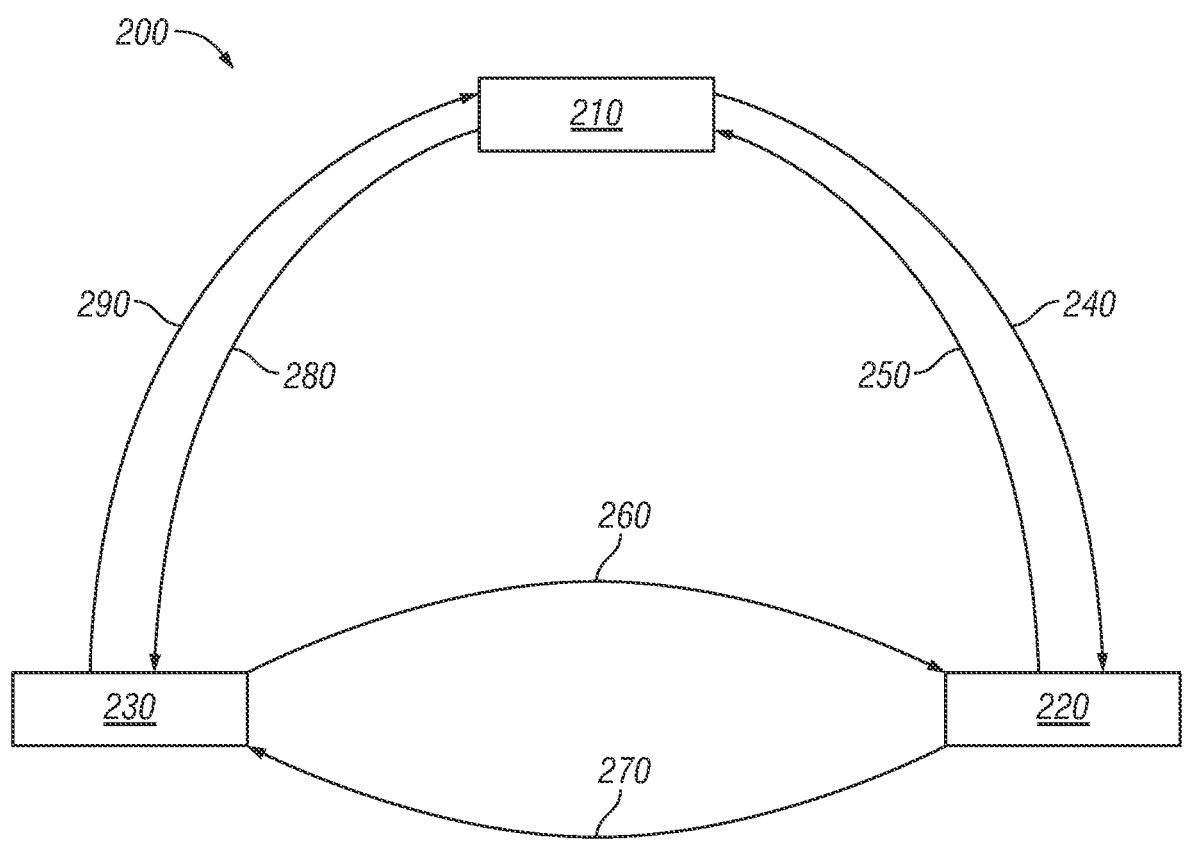
FIG. 2 is a diagram of an overview of an embodiment of an implementation described herein.

FIG. 2 is a diagram illustrating a simplified transaction process 200 involving the disclosed transaction card. The transaction process 200 involves the user 210 purchasing goods or services from a merchant 220. The transaction card is swiped, tapped, or inserted into a transaction card reader for sending a credit payment 240 to the merchant 220. The merchant 220 submits a reimbursement request and the transaction card information 270 to the issuing bank 230. The issuing bank 230 may include the transaction card issuer. The issuing bank 230 reviews the transaction card information 270 and the available funds in the account associated with the transaction card. The issuing bank 230 validates the transaction card if the transaction card information 270 is verified and the account has sufficient funds for the purchase. Upon receiving a notification that the transaction card information 270 is verified, the merchant 220 provides the purchased goods or services 250. The issuing bank 230 transmits the requested reimbursement 260 to the merchant when the transaction card is validated. The issuing bank 230 submits an invoice 290 to the user 210 for the accrued charges to the user's account, to which the user 210 submits a payment 280.

During the transaction process 200, the complete transaction card number (e.g., account number) is never publicly displayed. Importantly, the complete transaction card number is not provided during the credit payment 240 or the receipt of the goods or services 250. Instead, transactions 240 and 250 only disclose the personalized indicia of the transaction card. Further, the merchant may verify the credit card by comparing the personalized indicia with the visible account characters on the receipt.

In another embodiment, a user 210 may set a charge limit on the amount that can be charged in a single credit card payment 240. If the credit card payment 240 exceeds the charge limit, then a charge limit alert will be sent to the user 210. In at least one example, the alert may be sent to the user 210 via text message, email, app notification, phone call, or other secure notification method. In some embodiments, the alert contains information describing the transaction 250, the credit payment 240, the merchant 202, the time, date, location of the transaction 250, or other relevant information.

The charge limit alert may ask the user 210 whether the transaction 250 is authorized or not. If the user 210 confirms the transaction 250, then the transaction process 200 proceeds normally. If the user 210 annuls the transaction 250, then the bank 230 will decline the merchant's 220 reimbursement request 270. Declining the merchant's 220 reimbursement request 270 stops the transaction 250 and will prevent the user's 210 account from being charged the credit card payment 240 amount. This technique provides the benefit of stopping fraudulent transactions with the transaction card because the user 210 becomes notified about the transaction 250 from the charge limit alert and must confirm the transaction 250 before the bank 230 sends a reimbursement 260 to the merchant 220.

In another embodiment, the transaction process 200 does not involve the transaction card, but instead involves the user 210 purchasing goods or services from a merchant 220 online. Instead of swiping, tapping, or inserting the transaction card, the user 210 enters the transaction card number with the merchant's 220 online payment portal to make a purchase. The merchant 220 submits a reimbursement request and the transaction card information 270 to the issuing bank 230. The user 210 will be sent an online purchase alert regarding the transaction 250. In at least one example, the alert may be sent to the user 210 via text message, email, app notification, phone call, or other secure notification method. In some embodiments, the alert contains information describing the transaction 250, the credit payment 240, the merchant 202, the time, date, and location of the transaction 250, or other relevant information. If the user 210 confirms the transaction 250, then the transaction process 200 proceeds normally. If the user 210 annuls the transaction 250, then the bank 230 will decline the merchant's 220 reimbursement request 270. Declining the merchant's 220 reimbursement request 270 stops the transaction 250 and will prevent the user's 210 account from being charged the credit payment 240 amount.

In yet further embodiments, the user 210 may purchase a monthly subscription from a merchant 220 using the transaction card or the transaction card number online. The merchant 220 submits a reimbursement request and the transaction card information 270 to the issuing bank 230. The user 210 will be sent a subscription alert regarding the recurring transaction 250. In at least one example, the alert may be sent to the user 210 via text message, email, app notification, phone call, or other secure notification method. In some embodiments, the alert contains information describing the transaction 250, the credit payment 240, the merchant 202, the time, date, and location of the transaction 250, or other relevant information. In at least one example, the user 210 will need to provide details about the merchant 220 to confirm the recurring transaction 250. The user 210 may need to provide the merchant's 220 name, address, phone number, or other information. After the bank 230 receives and verifies the information, the credit payment 240 will be charged every subscription period. The subscription period may be monthly, yearly, or some other fixed period. If the user 210 has set a charge limit on the transaction card, then the subscription credit payment 240 must be less than the charge payment to automatically process at every subscription period. Otherwise, the user 210 will be sent a charge limit alert as described above. If the user 210 annuls the transaction 250, then the bank 230 will decline the merchant's 220 reimbursement request 270.

In yet another embodiment, the user 210 may confirm the transaction 250 with the merchant 220 by selecting an option within each alert titled "yes," or some equivalent thereof. The user 210 may annul the transaction 250 with the merchant 220 by selecting an option within each alert titled "no," or some equivalent thereof. In one example, an alert will be sent to the user 210 for every subsequent transaction with the merchant 220.

Figure 3:
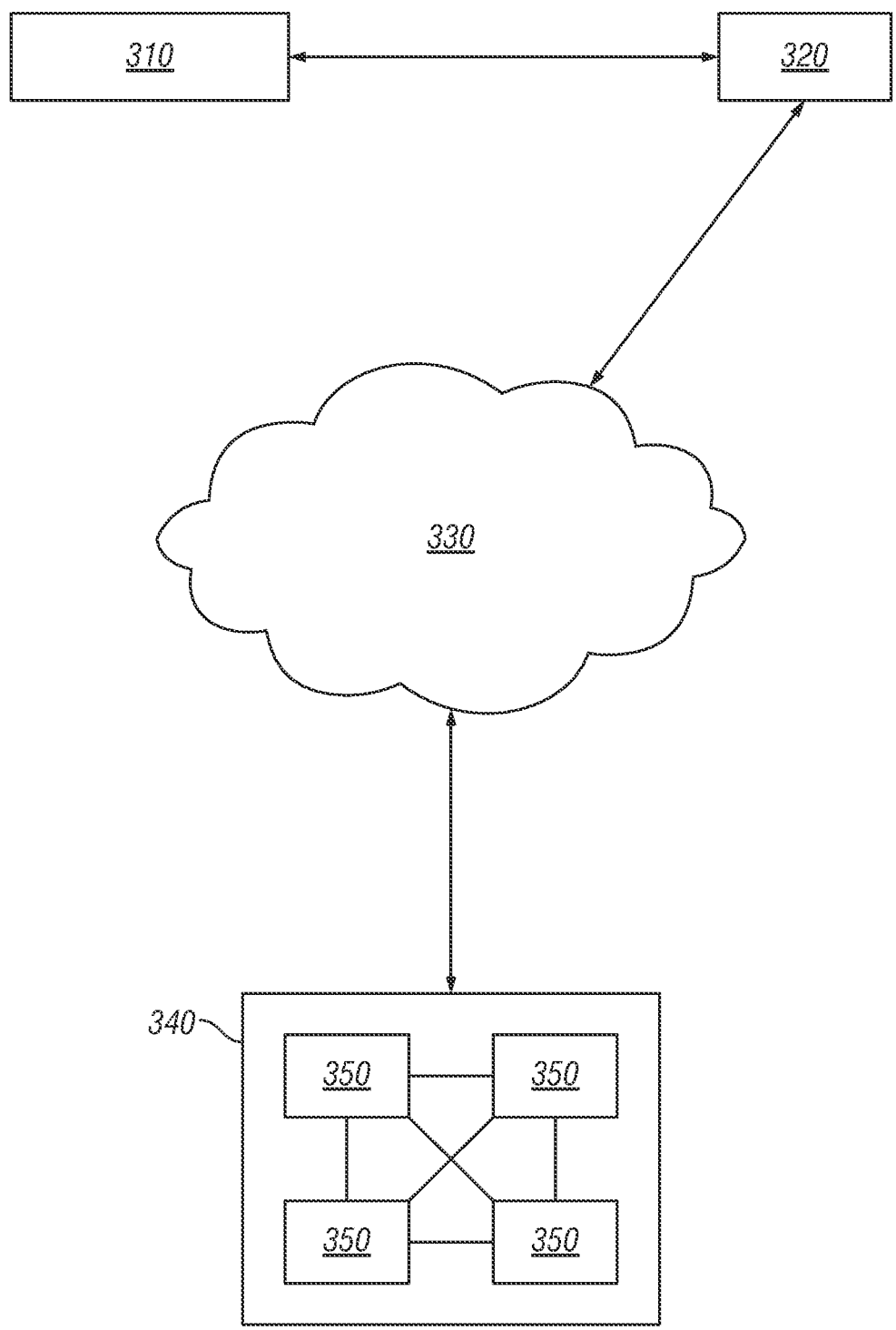
FIG. 3 is a diagram of an environment in which systems and/or methods, described herein, may be implemented.

FIG. 3 is a diagram illustrating a simplified environment implementing systems and/or methods, described herein. The environment includes a transaction card 310, a transaction card reader 320, and an issuing bank platform 340. As described herein, the transaction card 310 may include an encoded portion and a personalized indicia. The encoded portion stores the complete transaction card number and is configured to communicate with the transaction card reader 320. The transaction card reader 320 and the issuing bank platform 340 may communicate via a network 330.

The issuing bank platform 340 may include one or more devices 350 capable of receiving, generating, storing, processing, and/or providing information associated with the transaction card. For example, the issuing bank platform 340 may include a server, a group of servers, and/or the like. In some configurations, the issuing bank platform 340 may be partially or entirely implemented in a cloud computing environment. A cloud computing environment includes an environment that delivers computing as a service, whereby shared resources, services, etc. may be provided to the issuing bank platform 340.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment may perform one or more functions described as being performed by another set of devices or the environment.

Figure 4:
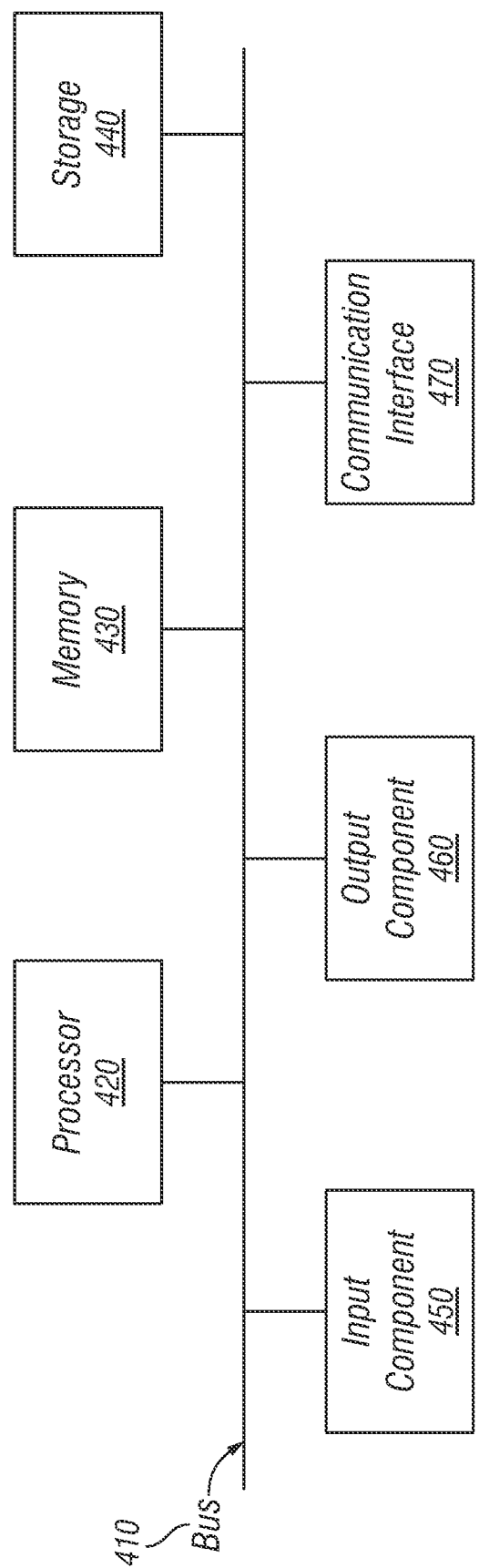
FIG. 4 is a diagram of example components of one or more devices of FIG. 3.

FIG. 4 is an illustration of example components of a device (not pictured) The device may correspond to the transaction card reader and/or the issuing bank platform. In some configurations, the transaction card reader and the issuing bank platform may include one or more devices and/or one or more components of the device. As shown in FIG. 4, the device may include a bus 410, a processor 420, a memory 430, a storage component 440, an input component 450, an output component 460, and a communication interface 470.

Bus 410 includes a component that permits communication among the components of the device. Processor 420 is implemented in hardware, firmware, or a combination of hardware and software. The processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of the device. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits the device to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from the device (e.g., a display, a speaker, and/or one or more light-emitting diodes (LEDs)).

Communication interface 470 includes a transceiver-like component (e.g., a transceiver and/or a separate receiver and transmitter) that enables the device to communicate with other devices, such as via a wired connection, a wireless connection, or a combination of wired and wireless connections. Communication interface 470 may permit the device to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

The device may perform one or more processes described herein. The device may perform these processes based on the processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device may include additional components, fewer components, different components, or differently arranged components than those shown in FIG. 4. Additionally, or alternatively, a set of components (e.g., one or more components) of the device may perform one or more functions described as being performed by another set of components of the device.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A transaction card for secure payments comprising:
   a personalized indicia displayed on a surface of the transaction card; and
   an encoded portion configured to communicate with a transaction card reader, wherein a complete transaction card number associated with the transaction card is stored on the encoded portion.

2. The transaction card of claim 1, wherein the personalized indicia consist of numbers.

3. The transaction card of claim 1, wherein the personalized indicia consist of letters.

4. The transaction card of claim 1, wherein the personalized indicia consist of numbers and letters.

5. The transaction card of claim 1, wherein the complete transaction card number includes the personalized indicia.

6. The transaction card of claim 5, wherein when the complete transaction card number is transmitted to the transaction card reader for authorizing a payment, only the personalized indicia is displayed on the transaction card reader.

7. The transaction card of claim 1, wherein a billing address associated with the transaction card is stored on the encoded portion.

8. The transaction card of claim 1, wherein the encoded portion is a magnetic strip, a contact chip, a contactless chip, or any combination thereof.

9. The transaction card of claim 1, wherein the personalized indicia is displayed on a rear surface of the secure transaction card.

10. The transaction card of claim 1, wherein the personalized indicia is displayed on a front surface of the secure transaction card.

11. A method of manufacturing a transaction card having an encoded portion, the method comprising:
    receiving, from a user, a personalized indicia associated with the transaction card;
    displaying the personalized indicia on the transaction card; and
    storing a complete transaction card number on the encoded portion, wherein the encoded portion communicates with a transaction card reader.

12. The method of claim 11, wherein the personalized indicia consist of numbers.

13. The method of claim 11, wherein the personalized indicia consist of letters.

14. The method of claim 11, wherein the personalized indicia consist of numbers and letters.

15. The method of claim 11, wherein the personalized indicia is displayed on a rear surface of the transaction card.

16. The method of claim 11, wherein the personalized indicia is displayed on a front surface of the transaction card.

17. The method of claim 11, wherein the complete transaction card number includes the personalized indicia.

18. The method of claim 17, wherein when the complete transaction card number is transmitted to the transaction card reader for authorizing a payment, only the personalized indicia is displayed on the transaction card reader.

19. The method of claim 11, wherein a billing address associated with the transaction card is stored on the encoded portion.

20. The method of claim 11, wherein the encoded portion is a magnetic strip, a contact chip, a contactless chip, or any combination thereof.

\* \* \* \* \*